(12) United States Patent
Wesie et al.

(10) Patent No.: US 10,140,130 B2
(45) Date of Patent: Nov. 27, 2018

(54) SYSTEM AND METHOD OF OBFUSCATION THROUGH BINARY AND MEMORY DIVERSITY

(71) Applicant: Runsafe Security, Inc., McLean, VA (US)

(72) Inventors: Andrew Michael Wesie, Austin, TX (US); Brian Sejoon Pak, Austin, TX (US)

(73) Assignee: RUNSAFE SECURITY, INC., McLean, VA (US)

( * ) Notice: Subject to any disclaimer, the term of this patent is extended or adjusted under 35 U.S.C. 154(b) by 99 days.

(21) Appl. No.: 15/093,269

(22) Filed: Apr. 7, 2016

(65) Prior Publication Data

US 2016/0299765 A1    Oct. 13, 2016

Related U.S. Application Data

(60) Provisional application No. 62/144,092, filed on Apr. 7, 2015.

(51) Int. Cl.
*G06F 9/44* (2018.01)
*G06F 9/4401* (2018.01)
(Continued)

(52) U.S. Cl.
CPC ........ *G06F 9/4401* (2013.01); *G06F 9/45558* (2013.01); *G06F 21/14* (2013.01);
(Continued)

(58) Field of Classification Search
None
See application file for complete search history.

(56) References Cited

U.S. PATENT DOCUMENTS

2005/0268189 A1\* 12/2005 Soltis, Jr. ....... G01R 31/318307
714/724
2007/0226711 A1\* 9/2007 Challener ............. G06F 21/125
717/141
(Continued)

FOREIGN PATENT DOCUMENTS

WO    WO-2013/130548 A2    9/2013

OTHER PUBLICATIONS

Rajagopalan, et al., "Binary Rewriting of an Operating System Kernel," Proc. Workshop on Binary Instrumentation and Applications, 8 pgs. (2006).
(Continued)

*Primary Examiner* — Kim Huynh
*Assistant Examiner* — Danny Chan
(74) *Attorney, Agent, or Firm* — Wilmer Cutler Pickering Hale and Dorr LLP

(57) ABSTRACT

A system and method for obfuscating binary codes are disclosed. In one embodiment, the system for obfuscating binary codes comprises one or more processors. The one or more processors may be configured to receive a binary file. The one or more processor may further be configured to obfuscate the binary file. The obfuscation may be based on rewriting the binary file and generating a second binary-randomized binary file. The binary file and the second binary-randomized binary file are functionally equivalent. The obfuscation may be based on randomizing the binary file at a load time, without changing functionality of the binary file.

11 Claims, 4 Drawing Sheets

(51) Int. Cl.
 *G06F 21/14* (2013.01)
 *G06F 9/455* (2018.01)
(52) U.S. Cl.
 CPC .............. *G06F 2009/45587* (2013.01); *G06F 2221/2125* (2013.01)

(56) References Cited

U.S. PATENT DOCUMENTS

| | | | |
|---|---|---|---|
| 2012/0102333 | A1 | 4/2012 | Wong |
| 2012/0204039 | A1 | 8/2012 | Farrugia et al. |
| 2012/0260106 | A1 | 10/2012 | Zaks et al. |
| 2012/0284688 | A1* | 11/2012 | McLachlan ........... G06F 21/125 717/110 |
| 2013/0036473 | A1* | 2/2013 | Myles ..................... G06F 21/14 726/26 |
| 2013/0091318 | A1* | 4/2013 | Bhattacharjee ..... G06F 12/1475 711/6 |
| 2014/0082329 | A1* | 3/2014 | Ghose ................... G06F 9/3877 712/208 |
| 2015/0047049 | A1 | 2/2015 | Panchenko et al. |

OTHER PUBLICATIONS

International Search Report and Written Opinion issued by the U.S. Patent and Trademark Office as International Searching Authority for International Application No. PCT/US16/26335 dated Jul. 15, 2016 (8 pages).

\* cited by examiner

SYSTEM AND METHOD OF OBFUSCATION THROUGH BINARY AND MEMORY DIVERSITY

CROSS-REFERENCE TO RELATED APPLICATIONS

This application claims the benefit of U.S. Provisional Patent Application No. 62/144,092, filed Apr. 7, 2015, entitled "System and Method for Kernel Security through Binary and Memory Diversity," which is hereby incorporated by reference herein in its entirety.

FIELD OF THE DISCLOSURE

The system and method of present disclosure pertains to novel systems and methods for protecting modern operating systems from compromise and misuse by unauthorized users. The system and method of present disclosure can be applied across many different operating systems (e.g., Linux, UNIX, Windows).

BACKGROUND OF THE DISCLOSURE

General Problems

Operating Systems may be attacked in different ways. For example: a copy of an operating system ("OS") is the same on millions of phones, hundreds of thousands of cars, etc. One way hackers craft attacks is to acquire (buy, steal, and/or borrow) a device or software that is representative of their eventual target. Using that device, the attacker may study the software on the device, a practice known as reverse engineering, looking for weaknesses and vulnerabilities. If a vulnerability is identified that meets certain criteria, it is possible the vulnerability can be weaponized, as an exploit. The exploit is code written by the hacker that utilizes the vulnerability for a specific purpose. The range of purposes includes privilege escalation, data exfiltration, denial of service, etc. Depending on the nature of the vulnerability and exploit, the exploit might be usable against other devices of the same OS and hardware configuration. For example, smartphone jailbreaks are exploits figured out by someone, promulgated through the user community as a toolkit that anyone can use to achieve a jailbreak on their own device. The same principle applies to server OSs, embedded OSs in SCADA equipment, etc.; that is, figure out the attack on one device and levy the attack on similar devices.

In the last 24 months, there have been more than 200 documented vulnerabilities in the Linux OS and Kernel, according to the National Vulnerability Database. The cost of rewriting, patching, etc. may be very expensive.

Vulnerability of Virtualized and/or Cloud-Based Operating Systems

When OSs run on bare metal, as they did for the first few decades of the micro-computer age, there was structure security in the physical separation between computers. In a cloud environment, this concept of security is challenged, because there is neither physical nor even logical separation between the guest OSs. Even if they ran on separate physical machines, the cloud system centrally manages the allocation of resources, guest OSs, etc. Because many layers of computing, networking, and decision logic are between the guest OSs' binary instruction and the actual execution on the host system, there are many opportunities for attackers to use the virtualization as a basis for attack.

Vulnerability of Embedded Operating Systems

In some parts of the world, computing has already achieved a degree of ubiquity, with low-cost embedded computers popping up an uncountable number of times a day (traffic signals, transit communications, building environmental control, point-of-sale systems, smartphones, tablets, wireless networking, security systems, environmental data collection, automotive control systems, and many more).

In the past, the only systems with enough processing power and financial importance to be worth hacking were corporate and governmental IT assets. Today, these systems are everywhere, without even the historical layers of protection from being behind locked doors. Today's embedded systems have a few constraints, each of which has a security impact:

1. Supply chains are managed to reduce hardware costs by fractions of pennies because the eventual sales price of the system is low. Operational security controls (guards, inspections, etc.) add cost to manufacturing that might be avoided in order to maintain price competitiveness. The same cost perspective might impact electronics design by cutting out security circuitry (e.g. trusted platform modules). Attackers could bake themselves into a large swath of commercial products by manipulating a firm's supply chain, electronic components, etc.
2. Large numbers of identical products will be manufactured and they will be relatively inexpensive to acquire. In the days of mini computers, attackers had a much harder time acquiring hardware on which to formulate and test attacks.
3. Decades ago, almost all components of a defense weapons system were entirely proprietary and custom manufactured. The result was that to craft an attack, the attacker needed a piece of the hardware in question, access to which was highly guarded. Today, commercial electronics are increasingly relevant to weapons systems because they decrease design time and testing cost. The military industrial complex needs tools to address the increasing base of commercial software/hardware in sensitive systems because an attacker can easily gain access to subcomponents or other electronics. This allows the attacker to find their way deep into a system by attacking the vulnerabilities of the publicly available systems.

SUMMARY OF THE DISCLOSURE

A system and method for obfuscating binary codes are disclosed. In one embodiment, the system for obfuscating binary codes comprises one or more processors. The one or more processors may be configured to receive a binary file. The one or more processors may further be configured to obfuscate the binary file. The obfuscation may be based on rewriting the binary file and generating a second binary-randomized binary file. The binary file and the second binary-randomized binary file are functionally equivalent. The obfuscation may be based on randomizing the binary file at a load time, without changing functionality of the binary file.

In accordance with other aspects of this embodiment, the one or more processors may further be configured to at least one of reorder basic blocks of the binary file and substitute an instruction of the binary file. Each of the basic blocks may run in an entirety without transferring.

In accordance with other aspects of this embodiment, the one or more processors may further be configured to randomize a page table associated with the binary file.

In accordance with other aspects of this embodiment, the one or more processors may further be configured to modify a page table allocation algorithm.

In accordance with other aspects of this embodiment, the one or more processors may further be configured to translate the binary file into a middleware format and add location and address information at a runtime.

In accordance with other aspects of this embodiment, the binary file may be a portion of a first kernel image.

In accordance with other aspects of this embodiment, the one or more processors may further be configured to generate a second binary-randomized kernel image comprising the second binary-randomized binary file.

In accordance with other aspects of this embodiment, the second binary-randomized kernel image may be deployed on a virtual machine.

In accordance with other aspects of this embodiment, the one or more processors may further be configured to randomize the binary file upon a first boot of a device on which the binary file is deployed.

In another embodiment, a method for obfuscating binary codes is disclosed. According to the method, a binary file may be received. The binary file may be obfuscated. The obfuscation may be based on at least one of: rewriting the binary file and generating a second binary-randomized binary file, wherein the binary file and the second binary-randomized binary file are functionally equivalent; and randomizing the binary file at a load time, without changing functionality of the binary file.

In still another embodiment, a non-transitory computer readable medium storing a computer-readable program of obfuscating binary codes is disclosed. The program may include computer-readable instructions to receive a binary file. The program may further include computer-readable instructions to obfuscate the binary file, based on at least one of: rewriting the binary file and generating a second binary-randomized binary file, wherein the binary file and the second binary-randomized binary file are functionally equivalent; and randomizing the binary file at a load time, without changing functionality of the binary file.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
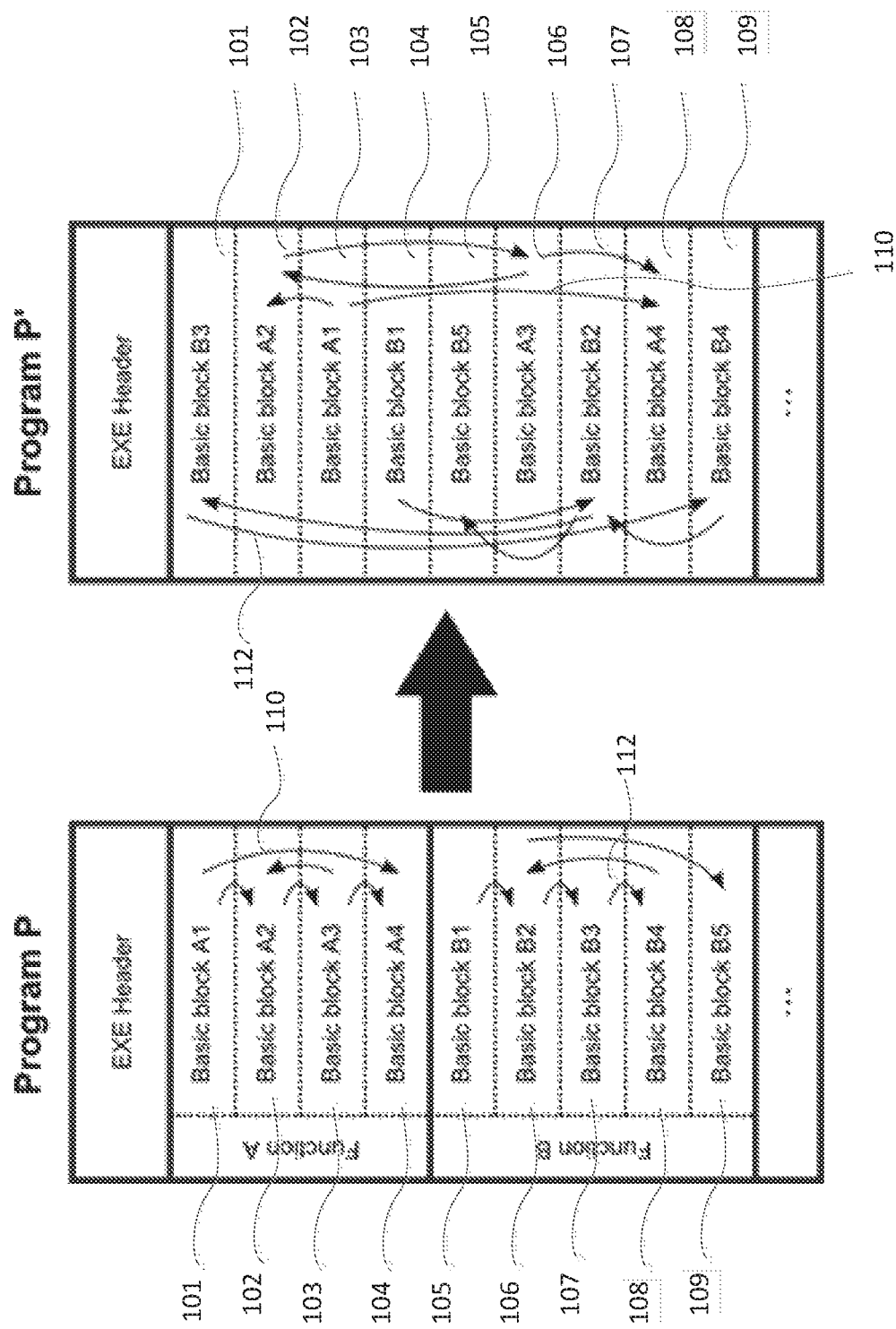
FIG. 1 shows a diagram depicting obfuscation via randomization of basic blocks (e.g. basic block reordering), in accordance with an embodiment of the present disclosure.

The system and method of the present disclosure may create a layer of security for OSs by randomizing kernel code locations and memory locations. For example, approximately 80% of recent code execution exploits in the Linux kernel have sensitivity to pointer and code addresses in the kernel. Non-predictable shifts in code locations and pointers can severely hamper the productivity for exploit writers. If an attacker is able to determine how to exploit vulnerability, the usefulness of the OS will be very limited.

When the system or method of the present disclosure is used, each successive instance of the OS (next router, cloud virtual machine, etc.) may have a completely different and random organization. Given that the Linux kernel has more than 37,000 files and 15,000,000 lines of code, more than enough building blocks exist to create trillions of combinations for creating kernel diversity according to the present disclosure.

The system and method of the present disclosure may include adopting static binary rewriting and memory obfuscation techniques to deployments of OSs. By using the system and method of present disclosure, IT and product managers will have the capability to make an arbitrary number of unique versions of a specific OS. While these copies will behave identically, the internals will be completely different, much like creating two different jigsaw puzzles from the same image. They look the same, but the component pieces are not interchangeable. For attackers, the system and method of the present disclosure may seriously undermine the assumption of fungibility.

Additionally, IT and product managers will have the capability to apply these protections, without developing expertise in kernel security. The system and method of the present disclosure may be applied with very limited modifications to the kernel source code and by direct manipulation of the kernel's binary files at an assembly level.

Reducing Exploitability by Randomizing Kernel Binaries

Being able to obfuscate portions of memory that contain executable code makes it significantly more difficult for a large number of common attack mechanisms to be successful. For instance, the well-known "return-to-libc" exploitation technique makes use of common system library code that is found in the address space of most processes to exploit systems that are protected from conventional buffer overflow mechanisms via common defense mechanisms, such as data execution protection ("DEP"). According to the present disclosure, static binary rewriting is unique in that it can add these same types of security guarantees that OS wide configurations have, such as the NX bit, without modifying the OS itself The system and method of present disclosure may include the capability to apply static binary rewriting to the types of environments encountered on networking and communications hardware, cloud environments, general embedded systems, and traditional IT systems. The system and method of the present disclosure may achieve this result while meeting the following criteria:

1. Applying binary rewriting to compiled binaries on a target system without degrading the security guarantees already upheld by that binary or changing the functionality of that binary.
2. Applying binary rewriting to compiled binaries on a target system was carried out without an appreciable increase in the runtime of that binary.

Many algorithms achieve closed-form, discrete transformations of assembly code. Two examples are (1) block reordering and (2) instruction substitution. These will be explained in greater detail subsequently.

FIG. 1 shows a diagram depicting obfuscation via randomization of basic blocks (e.g. basic block reordering), in accordance with an embodiment of the present disclosure. Most programs can be viewed as a set of basic blocks. These blocks include a sequence of instructions that modify memory, compute values, etc. However, a block is always run in its entirety, assuming the program does not crash. There are no transfers to other parts of the program within a single basic block. At the end of a basic block, control of the program will be transferred to one of many possible locations. Further, a basic block is only run when control is transferred to it from a number of other basic blocks. The transfers to and from the basic blocks are defined within a program, i.e. not defined within a library that the program is using, are normally static within the program. So, when the program is run and loaded into memory, it preferably will have the same starting base address and these static addresses of the basic blocks and functions they comprise are correct. This being the case, it is possible to shuffle the basic blocks of a program after it has been compiled and through careful analysis and modification such the program operation and flow remain the same, but its layout in memory is drastically transformed.

As shown in FIG. 1, the original compiled binary program P comprises Function A, which comprises basic blocks A1 to A4 as consecutive blocks, and Function B, which comprises basic blocks B1 to B5 as consecutive blocks. The original compiled binary program P has been rewritten as binary program P' with basic block reordering. As shown in FIG. 1, for the original compiled binary program P, if loaded into the memory, basic block A1 has starting address 101; basic block A2 has starting address 102; basic block A3 has starting address 103; basic block A4 has starting address 104; basic block B1 has starting address 105; basic block B2 has starting address 106; basic block B3 has starting address 107; basic block B4 has starting address 108; and basic block B5 has starting address 109. After program P has been rewritten as program P', when P' is loaded into the memory, basic block A1 has starting address 103; basic block A2 has starting address 102; basic block A3 has starting address 106; basic block A4 has starting address 108; basic block B1 has starting address 104; basic block B2 has starting address 107; basic block B3 has starting address 101; basic block B4 has starting address 109; and basic block B5 has starting address 105. Accordingly, the memory layout of the rewritten binary program P' is drastically transformed as compared to the memory layout of the original binary program P. However, the functionality of P' remains the same (e.g., equivalent) as that of P. As shown in FIG. 1, the operation flow of P' remains the same as that of P. For example, operation flow 110 from basic block A1 to basic block A4 remains and operation flow 112 from basic block B3 to basic block B4 remains. In some embodiments, at least one basic block may be reordered.

Figure 2:
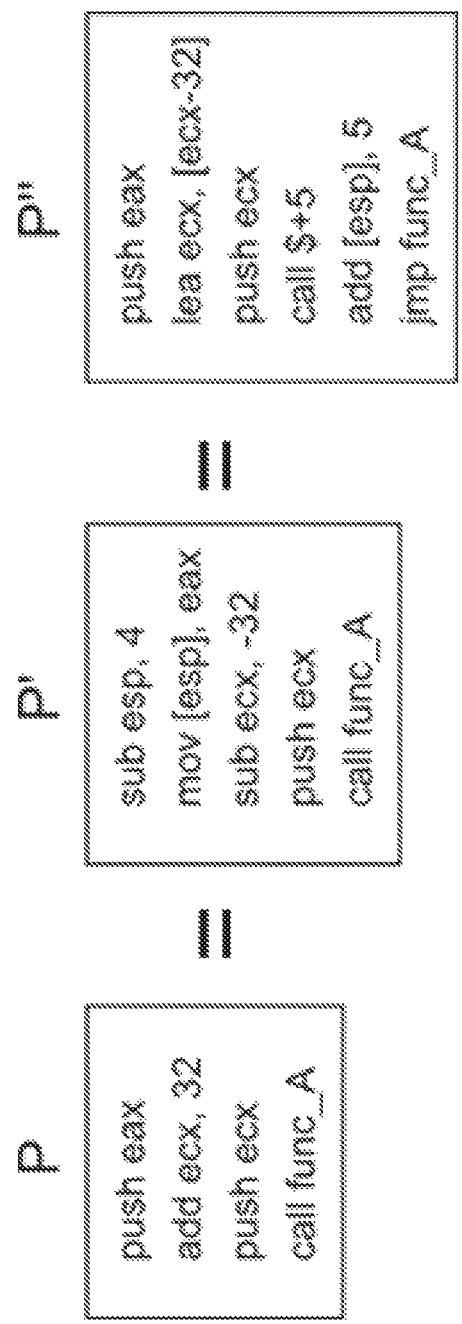
FIG. 2 shows a block diagram depicting instruction substitution (e.g., semantic code replacement), in accordance with an embodiment of the present disclosure.

FIG. 2 shows a block diagram depicting instruction substitution (e.g., semantic code replacement), in accordance with an embodiment of the present disclosure. The instruction sets of even the most basic reduced instruction source computing ("RISC") processors found in the hardware encompassed by networking and communications equipment are still quite large. As such, there exist sequences of instructions that can be substituted for one or more other sequences of instructions. For example, the addition of a positive number is identical to the subtraction of a negative number, or the moving of the value 0 into a register is identical to the bitwise XORing of that register with itself. These are simple examples of what may be used but others are possible. Care must be taken to ensure that the replacement instructions modify the state of the processor and system identically, e.g. setting status flags. With such transformations, it is possible to dramatically change the instruction level representation of a program while not affecting its functionality. As shown in FIG. 2, programs P, P', and P''' all result in the same changes to memory and processor state, but feature unique instruction streams. As shown in FIG. 2, program P comprises instructions "push eax", "add ecx, 32", "push ecx" and "call func_A". Program P' comprises instructions "sub esp, 4", "mov [esp], eax", "sub ecx, −32", "push ecx" and "call func_A". Program P''' comprises instructions "push eax", "lea ecx, [ecx-32]", "push ecx", call "$+5", "add [esp], 5" and "jmp func_A". Programs P, P' and P''' as shown in FIG. 2 are functionally equivalent with code variations.

In order to be applicable to the targeted network hardware, the binary rewriting tools produced must be able to rewrite operating system code ("OSC"), i.e., the kernel. This is because most of the functionality implemented by these systems is handled by the kernel. A variety of technical issues arise due to the complexity of kernel type code and the tendency of this code to interact closely with the underlying hardware. For example, indirect function calls occur significantly more often in OSC than application code which requires pointer analysis to determine the function being called, this shown in Rajagopalan et al. (Mohan Rajagopalan, Somu Perianayagam, HaiFeng He, Gregory Andrews, and Saumya Debray; Binary Rewriting of an Operating System Kernel; Proceedings of the Workshop on Binary Instrumentation and Applications, June 2006). Also, determining the possible entry points for a section of code is complicated by the presence of system calls and interrupts handlers, the latter of which may occur in any section of code where interrupts are not disabled. These factors make the problem more difficult, but if done correctly, they would significantly confound adversarial efforts relying on OS level code hacking for entry and exploitation.

Reducing Exploitability by Utilizing Page Table Randomization

For many applications, modifying or obfuscating data as it moves in and out of memory is not possible. When a piece of code writes data into memory, it expects to get the exact same data out, in the same order, when it goes to access that data again. Therefore, shuffling around data in memory as a means of obscuring it from the view of an attacker may not be feasible. However, applications and OSs do not work with direct access to memory and instead use virtual memory. If obfuscation was applied at the virtual memory layer, adversaries running beneath the virtual memory layer would see obfuscated memory but applications running above it would not. So an adversary reading directly from physical memory would have to overcome these obfuscations. This type of obfuscation may be achieved by randomizing the page table entries.

In this context, page tables act as translation mechanisms between addresses in virtual memory and physical memory.

The system and method of present disclosure may include an ability to apply page table randomization to the types of environments encountered on networking and communications hardware, cloud environments, general embedded systems, and traditional IT systems. The system and method of present disclosure may include the following benefits:

1. Applying page table randomization to the OS of a target system without degrading the security of the OS or changing its functionality.
2. Applying page table randomization to the OS of a target system without inflicting a significantly high performance overhead on that OS.

Modern OSs and software access memory via virtual addresses, as opposed to the physical addresses of memory (i.e., the addresses that go across the bus). This allows each process running on the system to have separate views of memory, and enables paging and memory protections. Even network appliances that may not have separate processes may still enable virtual addresses because of these additional benefits. The exact mapping between virtual address and physical addresses is described in either the page tables or Translation Lookaside Buffer ("TLB"), and is configured by the OS. The system and method of the present disclosure may provide for randomizing this mapping so that hardware trojans that are listening on the bus or directly accessing memory cannot rely on these mappings to be static.

This randomization technique may be compared to Address Space Layout Randomization ("ASLR") techniques that are used in many computer systems. However, with ASLR, the OS randomizes where code and data are located in the virtual address space, where in contrast page table randomization randomizes where code and data is located in the physical address space. Both techniques make use of existing hardware capabilities that make this sort of remapping very efficient. However, potential inefficiencies may be introduced on platforms that use a software-managed TLB, because page table randomization would be ineffectual if used with superpages (e.g., pages>=1 MB as opposed to the standard 4 KB). Page tables of 1 MB and larger could render the security benefits of page table randomization ineffective for two reasons. First, with 1MB page tables, many more consecutive basic blocks will be located together on the same virtual page, which increases the probability that when crucial sections of vulnerable code are identified, no further analysis is required to find companion gadgets. Second, the jump from page table size of 4 KB ($4 \times 10^3$) to 1 MB ($1 \times 10^6$) means that there are three orders of magnitude fewer page tables for the attacker to analyze.

The system and method of the present disclosure may implement the page table randomization defense mechanism in the FreeBSD kernel by modifying the page table allocation algorithms so that it is no longer easily predictable where the OS or user code and data is located in memory.

For x86 processors, the system or method of the present disclosure applies two approaches for page table randomization. The first approach takes place very early in the boot process and randomizes the data sections of the kernel binary. This is done because there are a few pages of data memory that cannot be easily randomized because they get addressed physically later if the computer has multiple processors. The second approach is to randomize the allocation of dynamic memory in the kernel. There are no restrictions on this; however, preferably, the amount of randomization is limited because wasting memory due to fragmentation is avoided in accordance with system and method of the present disclosure since there may be CPU-specific heaps and moving pages between them is expensive, and lastly the kernel needs to be able to do contiguous allocations of physical memory for dynamic memory access ("DMA") and such.

Exemplary Flowchart

Figure 3:
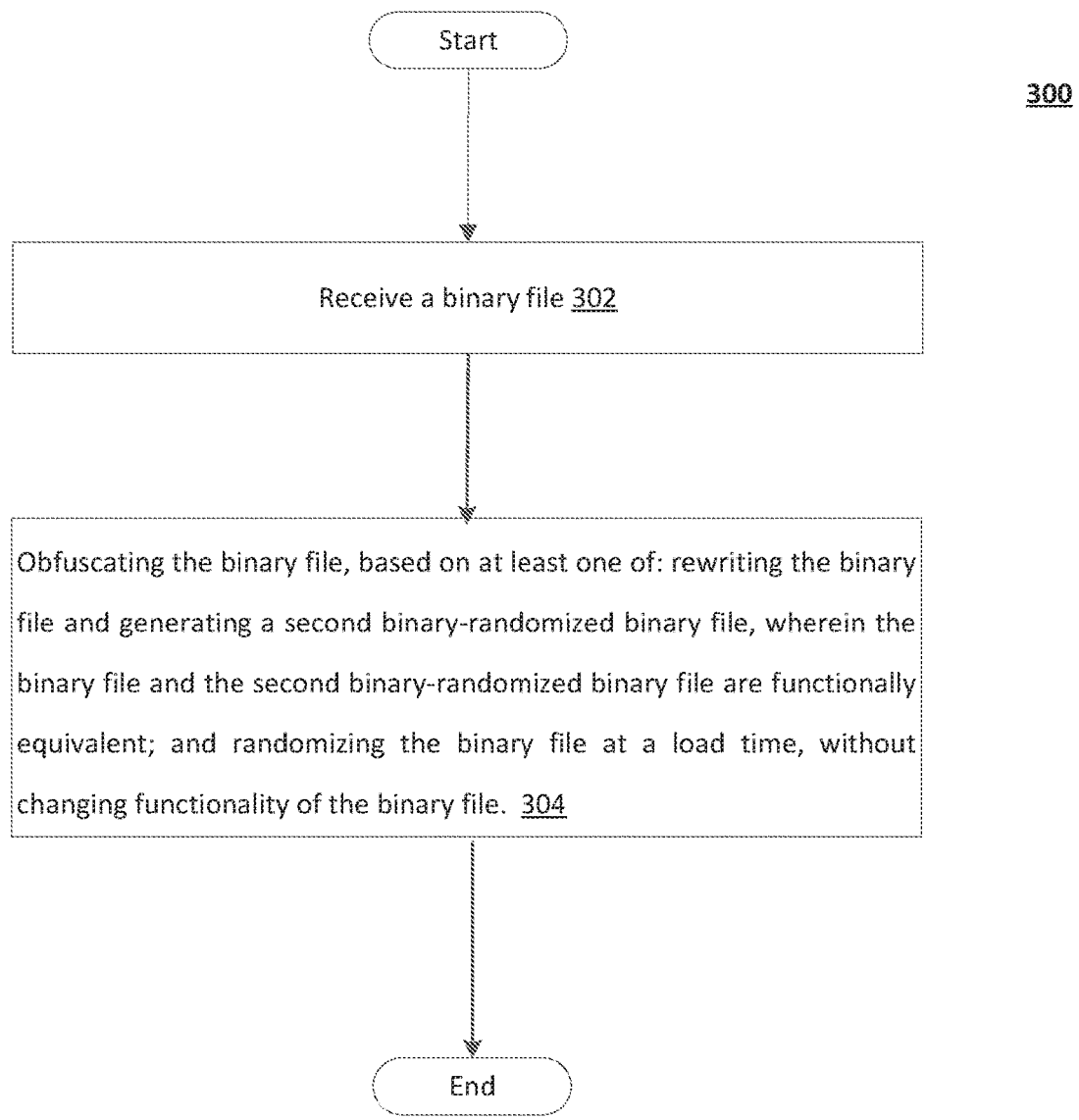
FIG. 3 shows a flowchart for obfuscation of binary codes, in accordance with an example method of the present disclosure.

FIG. 3 shows a flowchart for obfuscation of binary codes, in accordance with an example method of the present disclosure. Method 300 may include receiving a binary file (302) and obfuscating the binary file (304). Obfuscating the binary file may be based on at least one of: rewriting the binary file and generating a second binary-randomized binary file, wherein the binary file and the second binary-randomized binary file are functionally equivalent; and randomizing the binary file at a load time, without changing functionality of the binary file.

Method 300 may also include receiving a binary file (302). Method 300 may also include obfuscating the binary file (304). As described above and below, obfuscating the binary file may comprise at least one of: rewriting the binary file and generating a second binary-randomized binary file, wherein the binary file and the second binary-randomized binary file are functionally equivalent; and randomizing the binary file at a load time, without changing functionality of the binary file. In some embodiments, rewriting may be based on at least one of basic block reordering and instruction substitution. Randomization at load time may comprise randomizing a page table associated with the binary file. In some embodiments, the binary file may be randomized upon a first boot of the device on which the binary file is deployed.

Exemplary Deployment Use Cases

The following are representative use cases for the system and method of present disclosure.

Cloud/Virtualization

In cloud deployments, an IT manager may use the system and method of the present disclosure to create diversity amongst the OSs hosted in the manager's cloud environment. The system and method of the present disclosure may ensure that each virtual machine in the cloud environment will have a functionally-identical to and binary-randomized versions of, the base OS image.

Figure 4:
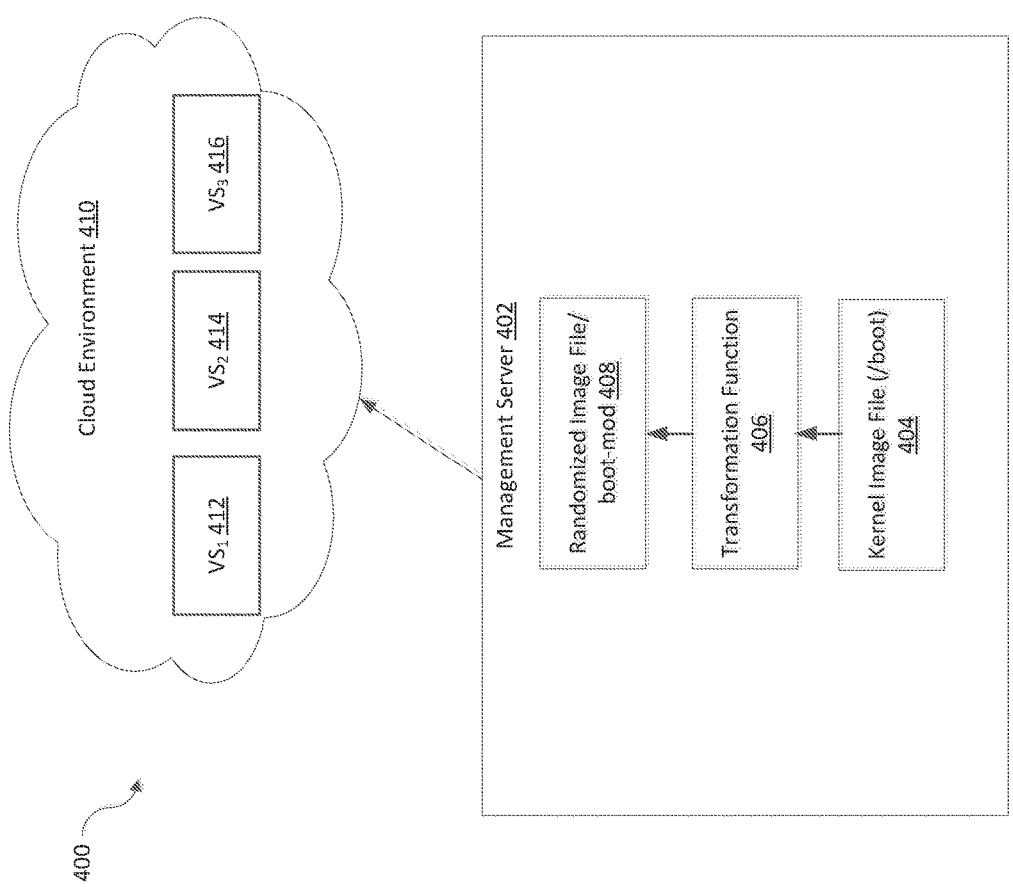
FIG. 4 shows a block diagram depicting a virtual server deployment, in accordance with an embodiment of the present disclosure.

FIG. 4 shows a block diagram depicting a virtual server deployment, in accordance with an embodiment of the present disclosure. Referring to FIG. 4, it shows at 400 a process in accordance with the present disclosure. For purposes of this illustration, target cloud environment 410 utilizes three virtual machines $VS_1$ 412, $VS_2$ 414, and $VS_3$ 416. The Transform Function 406 on management server 402 takes unmodified Kernel Image File (/boot) 404 as an input function. The output is a functionally-identical (e.g., functionally-equivalent) and binary-randomized Kernel Image File (/boot-mod) 408. The management structure for the cloud environment 410 may then transfer the/boot-mod image 408 to one of the virtual machines (e.g., $VS_1$ 412). The management server may then use Transform Function 406 to create another image file (functionally-identical, binary-randomized). The modified kernel is now transferred using the cloud management structure to transfer the kernel to $VS_2$ 414. The process may be repeated again for $VS_3$ 416. Applied to the current generation of virtualization technologies as used by VMware, Xen, Amazon, etc., the management server may be integrated with a hypervisor rather than a physically separate box.

Smartphone

Smartphones would use a separate kernel for each phone. At manufacture time, each phone would receive its own functionally-identical, binary-randomized kernel. Another way this could be handled would be for the bootloader to handle the randomization when the phone was turned on the first time. This has the advantage of allowing a common bootloader to be distributed, the randomized kernel could then be signed such that it has a hardware link to the device on which it is booted. Once the kernel was protected, the non-randomized version would be deleted. The weakness of this is that it relies on the bootloader. But if the bootloader kernel itself was protected with the methods of the present disclosure, compromising the bootloader will be much harder.

Enterprise Electronics

For purposes of the system and method of present disclosure, enterprise electronics refer to IT infrastructure that is a part of most businesses (routers, VPN boxes, security systems, etc.). These systems are high-value targets for compromise because they are often the information-highways, along which target data would traverse. At manufacture time, each router or other device would be implanted with its own copy of the kernel. Alternatively, the device could be manufactured with a common image that would randomize itself upon first boot. The first bootup could occur before the device leaves the manufacturer.

Automotive, SCADA, Weapon Systems, Internet of Things, General Purpose Embedded

The system of present disclosure can enhance the security of OSs running in an innumerable list of environments, including but not limited to: automotive and transportation systems, building control systems, energy control systems, and Internet of things.

For the system and method of the present disclosure to be additive, the underlying architecture would preferably include the following: an application processor that executes an instruction set architecture (ISA), a random access memory (RAM), and a persistent storage. The ISA preferably may include at a minimum, the following types of instructions: memory reads and writes, control flow (e.g., jumps, returns) and runtime decision-based logic.

Other Embodiments

Instruction Set Architectures

The system and method of the present disclosure is not structurally bound to any particular instruction set architecture. More specifically, kernels running on x86, ARM, PowerPC, Thumb, MIPS may all benefit from the system and method of the present disclosure. Additionally, the system and method of the present disclosure may apply to kernels running in virtualized architectures.

Device Firmware

Attackers have recently utilized modified device firmware as a basis for persistent compromise of computers, electronic systems, subsystems, etc. In PCs, hackers can compromise the BIOS to surreptitiously maintain a presence on the device even after replacing the OS, hard drive, and every other component in the device. Bootloaders on modern smartphones and tablets are the target of "jailbreaks" that allow attackers to make unauthorized changes to the smartphone's OS. Trusted execution environments, like ARM's TrustZone and Intel's SGX utilize a micro-kernel or firmware to power their secure elements. The system of present disclosure can increase the security of those kernels as well.

This firmware is executed in one of a few places on the device/peripheral, an application processor or a special purpose processor, optimized for certain types of performance. For example, modern network interface cards ("NICs") utilize an on-board network processor. This network processor has a micro-kernel that instructs the electrical/optical interface, during the processing of network traffic. This micro-kernel can be replaced by an attacker so that there is unauthorized and/or unintended network behavior. The system and method of the present disclosure can be applied to these firmware instances and micro-kernels, making the attacker's proposition much more difficult.

Operating Systems

The system and method of the present disclosure can hamper attacker exploit methods in most modern OSs. A non-exhaustive list would be: Linux, UNIX (and variants), Windows (all variations), QNX, AIX, HP-UX. Additionally, a complete OS is not needed for the system and method of the present disclosure to hamper attackers. Many devices, like home routers, run a large assembly (.bin) file that manages all aspects of the device's execution. This .bin file is not an OS, in the computer science sense of the word, but it can still benefit from the system and method of the present disclosure. The system on which the .bin runs would have memory, storage, and an application processor. The processor will have an instruction set architecture that includes arithmetic, memory operations, control flow instructions, etc. This is all that is required for the system and method of the present disclosure to enhance the security of the device.

Code-Signing Validation

Binary diversity helps address many questions about code-level security. It does create a problem though as it pertains to systems that use "signed code." Code signing provides a cryptographic basis for someone to determine that the code they are presented to run is the code that was made available by the right authority. At the most basic level, binary diversity as utilized in the system of present disclosure may be a challenge for code signing because each version of the kernel will have to be individually signed to be trusted by the verifier.

A few alternatives could be as follows:

When the functionally-identical, binary-randomized kernel is created, the hash of the new image could be signed by the verifier's private key. The verifier function on the end-user device (smartphone, tablet, etc.), could then validate that the hash is legitimate. Additionally, if the right information was available at manufacture time, key identifying information from the end-user device (HEXID, EIN, etc.) could be included in the signature, so that the manufacturer could restrict the variations of the kernel that could run on that device.

The system and method of the present disclosure could be integrated with the system signing infrastructure, so that each time a new kernel was created, it was simultaneously signed with the organization's private key. Then the signed images would be moved from the signing system to the organizations distribution and manufacturing system to be printed onto devices.

Over the air updates are also necessary to support. Currently phones distribute the same update to all affected devices. In this case, each device would be assigned its own image, ensuring that each binary is only transferred to one device.

Introspection Using TrustZone or a Hypervisor

Kernel introspection is the concept of probing the kernel's memory in order to determine if it is still in a safe state. The level of sophistication of existing solutions varies: TIMA uses very simple introspection, and VMware vShield Endpoint and McAfee DeepSAFE are much more complicated. There is potential to increase the efficacy of TIMA by better modeling of the kernel and making sure it hasn't deviated from this model. Additionally, there is an opportunity to create advanced denial of service protection using TrustZone.

Control Flow Integrity

Control-flow integrity ("CFI") remains a compelling technique to prevent most control-flow hijacks. Efforts to implement CFI securely in the kernel are frustrated by the use of hand-written assembly, DMA, and non-traditional control flows (e.g. interrupts, system calls). KCoFI and CPI are the two most compelling approaches to this problem thus far. KCoFI has serious performance concerns that may not be fixable. CPI has not been applied to kernels as of yet, but the work is in progress. The only solution to the problem with DMA is using an I/O Memory Management Unit (IOMMU), which is now ubiquitous on desktops and servers but not in embedded devices. CPI may be able to handle DMA as well, but it is not yet evident. The system of present disclosure may include control flow integrity techniques applied to the kernel, for systems that include IOMMUs and embedded systems that don't include IOMMUs.

Runtime/Loadtime Binary Diversity

Thus far, attackers have not had to worry much about randomization of code inside the kernel's address space. While dynamically loaded modules may be randomized on load, this is rarely the case for the kernel itself. Binary diversity changes this by randomizing the code in the binary so that every computer could have a binary that looks different to an attacker. In addition to this static randomization, it is also possible to extend it to include dynamic randomization. Once the analysis has been performed to figure out how to randomize the binary's code, the cost of randomizing at load-time is small and would result in a different code layout on every reboot. The system and method of the present disclosure may capture the binary randomization analysis by translating the protected kernel binaries into a middleware format, location and address information is added in at runtime. The relocation information could also be located in an accompanying file for each protected binary in the kernel. The system and method of the present disclosure may include the ability to modify kernel loading process such that the kernel code and data locations can be randomized at runtime.

Additionally, there is a growing need to identify ways to reduce the impact of information disclosure vulnerabilities. Currently, once an attacker can disclose some parts of memory the protections provided by ASLR, and possibly binary diversity, are severely maimed. One possible technique to armor binary diversity against these attacks is to introduce guard pages that provide a run-time defense against attempts to enumerate the binary's randomized code. Additionally, guards can be added into the code to obfuscate the control flow and provide a further defense against more advanced attempts to enumerate the code. The system and method of the present disclosure protects against information disclosure vulnerabilities in the kernel by including guard pages.

Binary-Level Vulnerability Patching

The system of the present disclosure includes the ability to place binary patches every time a new, randomized binary is created. This feature assists system managers, because the patches can be applied shortly after the vulnerabilities are identified, without managers needing to worry about rebuilding their kernel.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present disclosure described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present disclosure is not intended to be limited to the embodiments shown or described herein.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for obfuscating binary codes, comprising:
   a memory that stores a set of instructions; and
   one or more processors configured to execute the set of instructions to:

receive a binary file that is a portion of a first kernel image;

perform a binary randomization analysis and based on the analysis, translate the binary file into a middleware format where location and address information are added at a runtime; and obfuscate the binary file upon a first boot of a device on which the binary file is deployed, without changing functionality of the binary file; a wherein obfuscating the binary file is performed by at least one of reorder basic blocks of the binary file and substitute an instruction of the binary file, wherein each of the basic blocks runs in an entirety without transferring.

2. The system of claim 1, wherein the one or more processors are further configured to randomize a page table associated with the binary file.

3. The system of claim 2, wherein the one or more processors are further configured to modify a page table allocation algorithm.

4. The system of claim 1, wherein the one or more processors are further configured to generate a second binary-randomized kernel image comprising the obfuscated binary file.

5. The system of claim 4, wherein the second binary-randomized kernel image is deployed on a virtual machine.

6. A method for obfuscating binary codes, comprising:

receiving, by at least one computer processor in communication with at least one readable storage medium storing a computer program of instructions, a binary file that is a portion of a first kernel image;

performing a binary randomization analysis and based on the analysis, translating the binary file into a middleware format where location and address information are added at a runtime; and obfuscating, by at least one computer processor and based on the instructions, the binary file, upon a first boot of a device on which the binary file is deployed, without changing functionality of the binary file; a wherein obfuscating the binary file is performed by at least one of reordering basic blocks of the binary file and substituting an instruction of the binary file, wherein each of the basic blocks runs in an entirety without transferring.

7. The method of claim 6, further comprising randomizing a page table associated with the binary file.

8. The method of claim 7, further comprising modifying a page table allocation algorithm.

9. The method of claim 6, further comprising generating a second binary-randomized kernel image comprising the obfuscated binary file.

10. The method of claim 9, wherein the second binary-randomized kernel image is deployed on a virtual machine.

11. A non-transitory computer readable medium storing a computer-readable program of obfuscating binary codes, comprising:

computer-readable instructions to receive a binary file that is a portion of a first kernel image;

computer-readable instructions to perform a binary randomization analysis and based on the analysis, translate the binary file into a middleware format where location and address information are added at a runtime; and computer-readable instructions to obfuscate the binary file, upon a first boot of a device on which the binary file is deployed, without changing functionality of the binary file; a wherein obfuscating the binary file is performed by at least one of reorder basic blocks of the binary file and substitute an instruction of the binary file, wherein each of the basic blocks runs in an entirety without transferring.

* * * * *